United States Patent
Huang et al.

(10) Patent No.: US 11,408,986 B1
(45) Date of Patent: Aug. 9, 2022

(54) REVERSE ACOUSTIC CALIBRATION METHOD

(71) Applicant: The United States of America as represented by the Secretary of the Navy, Newport, RI (US)

(72) Inventors: Dehua Huang, Newport, RI (US); Gregory A Blasdell, Wakefield, RI (US); Gaivorlor D Borbor, Pawtucket, RI (US)

(73) Assignee: The United States of America as represented by the Secretary of the Navy

( * ) Notice: Subject to any disclaimer, the term of this patent is extended or adjusted under 35 U.S.C. 154(b) by 588 days.

(21) Appl. No.: 16/570,336

(22) Filed: Sep. 13, 2019

(51) Int. Cl.
*G01S 7/52* (2006.01)
*H04R 1/44* (2006.01)
*G01S 15/04* (2006.01)
*G01V 1/38* (2006.01)

(52) U.S. Cl.
CPC .......... *G01S 7/52004* (2013.01); *H04R 1/44* (2013.01); *G01S 15/04* (2013.01); *G01V 1/38* (2013.01)

(58) Field of Classification Search
CPC ....... G01S 7/52004; G01S 15/04; H04R 1/44; G01V 1/38
See application file for complete search history.

(56) References Cited

U.S. PATENT DOCUMENTS

| | | | | | |
|---|---|---|---|---|---|
| 3,659,255 | A | * | 4/1972 | Trott | G01S 7/52004 367/13 |
| 3,665,379 | A | * | 5/1972 | Trott | G01V 13/00 367/13 |
| 8,526,270 | B1 | * | 9/2013 | Huang | G01S 7/52004 367/13 |
| 2015/0234089 | A1 | * | 8/2015 | Dakin | G01V 13/00 367/13 |

* cited by examiner

*Primary Examiner* — Daniel Pihulic
(74) *Attorney, Agent, or Firm* — James M. Kasischke; Michael P. Stanley

(57) ABSTRACT

A method for calibrating an acoustic calibration tank providing the tanks with reference hydrophones positioned along the tank. The tank is filled with a fluid at a known temperature and pressure. A calibrated reverse hydrophone is positioned in the tank, opposite one of the reference hydrophones. A known acoustic wave is created in the tank using the calibrated reverse hydrophone and the opposite reference hydrophone output is measured. Free field voltage sensitivity is computed for the reference hydrophone. This gives the calibration factor for the reference hydrophone. The calibrated reverse hydrophone can be repositioned. An iterative process can be utilized for the other reference hydrophones, and other known pressures and temperatures.

4 Claims, 1 Drawing Sheet

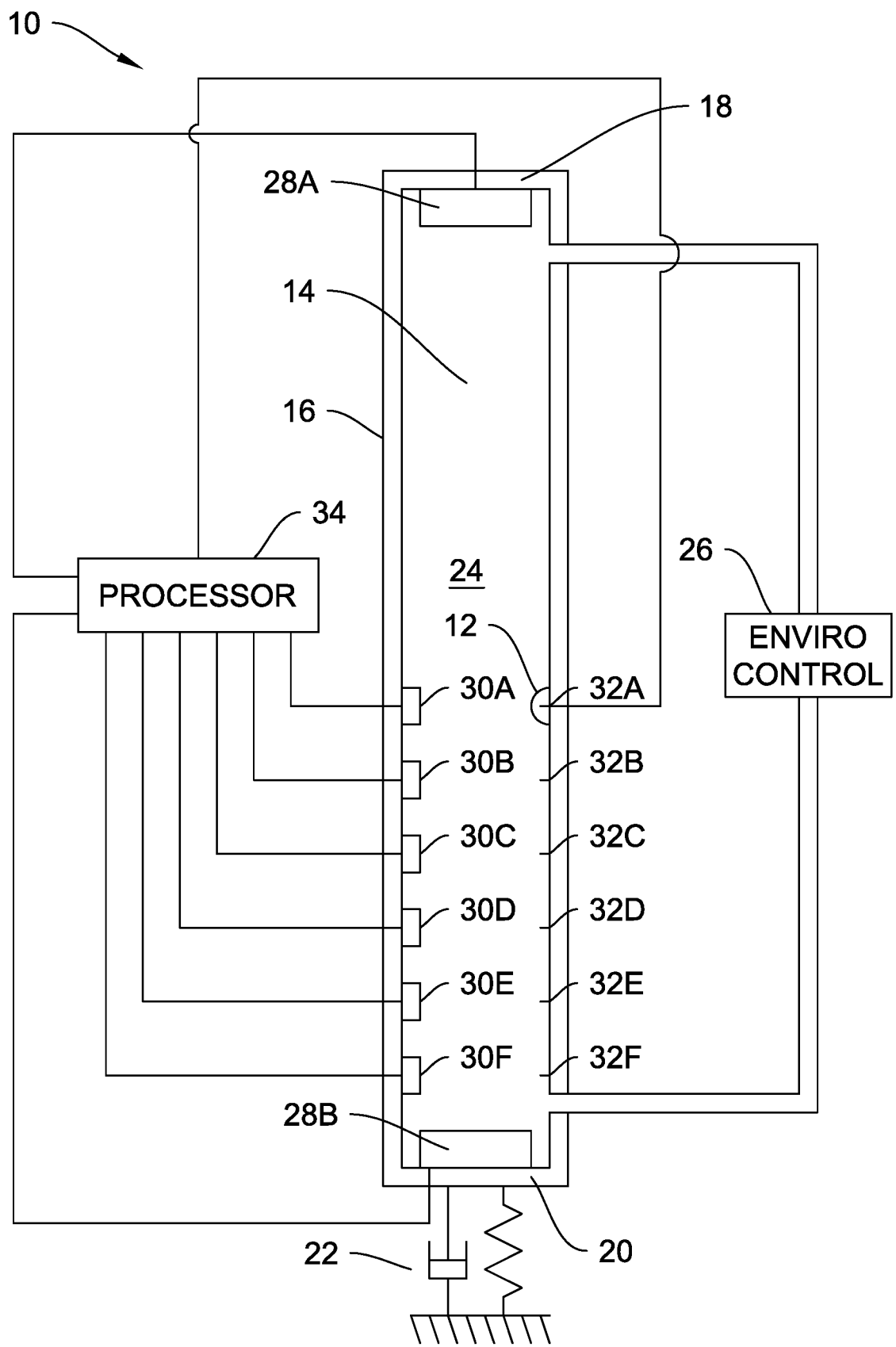

REVERSE ACOUSTIC CALIBRATION METHOD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to acoustic testing methods, and further to a simplified method for setting up an acoustic calibration tank.

(2) Description of the Prior Art

In the field of acoustic calibration, particularly that associated with underwater sensors, closed, insulated, pressure vessels are used for testing hydrophones at a variety of temperatures and pressures. A fluid such as distilled water is provided within the vessel. The walls of the vessel act as an acoustic waveguide. One type of vessel allows testing utilizing a single transducer that can establish an acoustic standing wave within the vessel. By changing the input signals to the transducers located at both ends of the vessel an acoustic travelling wave can be established within the vessel. Environmental control can be utilized for controlling the temperature and pressure within the vessel. The test vessel is typically isolated from external vibrations and noise.

In FIG. 1, there is shown calibration apparatus 10 capable of utilizing a standing or a traveling wave for calibration of an acoustic sensor 12. Apparatus 10 includes a vessel 14 having a wall 16, a first end 18 and a second end 20. Vibrational isolation 22 is used to prevent environmental vibrations from affecting the test. Interior 24 of vessel 14 is filled with a fluid such as distilled water; however, it can be filled with a gas, a solution such as seawater, an organic fluid such as oil, or a 50/50 percent mixture of deionized water and propylene glycol heat transfer fluid. Temperature and pressure of this fluid can be controlled and monitored by an environmental control system 26 in communication with interior 24. A transducer 28A is provided at first end 18 of vessel. Second end 20 includes a second transducer 28B within vessel 14.

A plurality of reference hydrophones 30A, 30B, 30C, 30D, 30E, and 30F are positioned at known, regularly spaced locations along interior surface of wall 16. Hydrophones 30A-30F are calibrated so that known acoustic pressures within vessel 14 produce a known voltage output. (Reciprocal coupling is used to calibrate the reference hydrophones.) A sensor 12 under test can be positioned at one of a number of mounting locations, 32A, 32B, 32C, 32D, 32E, and 32F, close to interior surface of wall 16 opposite one of said plurality of hydrophones such as 30A in FIG. 1.

A processor 34 is joined to transducers 28A and 28B; hydrophones 30A, 30B, 30C, 30D, 30E, and 30F; and sensor 12 under test for controlling operation of the testing and recording data. Processor 34 includes a general-purpose computer, appropriate signal generators, and analog to digital converters as known in the art for receiving and generating signals.

In operation, processor 34 generates a transducer output signal that is provided to transducer 28A. Transducer output signal is generated at a frequency and amplitude that is calculated to produce a known acoustic wave within vessel 14. Processor 34 is joined to transducer 28B to produce a complementary wave that will interact with the acoustic waves from transducer 28A to give the known acoustic wave. In order to produce a traveling wave, transducer 28B is driven at the same frequency as transducer 28A but at a phase and amplitude calculated to cancel reflections. The amplitudes, phases, and frequencies can be adjusted by monitoring the outputs of reference hydrophones 30A, 30B, 30C, 30D, 30E, and 30F. This allows production of a traveling wave. The equation for these known waves are:

$$p = p_0 e^{j(\omega t - kx)} \tag{1}$$

propagating from top 18 to bottom 20, for traveling wave and $$p = 2A e^{j\omega t} \cos(kx + \varphi_0) \tag{2}$$

for standing wave, where p is the acoustic pressure, $p_0$ or A is the constant wave amplitude, $\varphi_0$ is the phase angle, t is for time, k is the wave number, and x is the coordinate of any one of the six reference hydrophone locations.

Once the traveling or standing wave is established, the calibration of the acoustic sensor 12 free field voltage sensitivity (FFVS) $M_{customer}$ can be calculated by comparison of the sensor 12 signal output, $V_{customer}$, with the sensitivity $M_{reference}$ and output $V_{reference}$ of the known reference hydrophone, such as the hydrophone at 30A, in accordance with the following equation:

$$M_{customer} = M_{reference} + 20 \log\left(\frac{V_{customer}}{V_{reference}}\right) \tag{3}$$

$M_{reference}$ is the pre-calibrated, known reference sensitivity (FFVS) of the hydrophone at 30A.

Other factors impact the output signals. The output signal from each hydrophone passes through in-tank cables, a tank penetrator, a length of tri-axial cable, differential buffer amplifier, another tri-axial cable, signal splitter, and data acquisition interface for digitization before any processing. Each of these contributes a portion of the overall transfer function $H(\omega)$ to the final signal output.

Calibration of sensor 12 is routine when calibration apparatus 10 is properly calibrated. One end of vessel 14 is opened, and sensor 12 is mounted in vessel 14. Sensor 12 is then calibrated under specific combinations of pressure and temperature as controlled by environmental control 26. Pressure and temperature within the fluid can be further quantified by having a pressure gage and thermometer in communication with fluid 24 in vessel 14.

Properly calibrating apparatus 10 is required whenever reference hydrophones, transducers, or cable connections inside vessel 14 malfunction. Apparatus 10 must be disassembled, and each of the reference hydrophones must be individually calibrated utilizing reciprocity calibration, as known in the art. Transfer function contributions must be reassessed. Recalibration requires weeks or months of downtime.

It is thus desirable to provide another method of calibrating acoustic test apparatus that can be performed over a shorter period.

SUMMARY OF THE INVENTION

It is a first object of the present invention to provide a simplified method for calibrating an acoustic test tank.

Another object is to provide a method that allows calibration at different pressures and temperatures.

Yet another object is to provide a calibration method that doesn't require disassembly and independent testing of the sensors.

Accordingly, a method for calibrating an acoustic calibration tank provides the tank with reference hydrophones positioned along the tank. A calibrated reverse hydrophone is positioned in the tank, opposite one of the reference hydrophones. A known acoustic wave is created in the tank using the calibrated reverse hydrophone and the opposite reference hydrophone output is measured. Free field voltage sensitivity is computed for the reference hydrophone. This gives the calibration factor for the reference hydrophone. The calibrated reverse hydrophone can be repositioned. An iterative process can be utilized for the other reference hydrophones, and other pressures and temperatures.

BRIEF DESCRIPTION OF THE DRAWINGS

Reference is made to the accompanying drawings in which are shown an illustrative embodiment of the invention, wherein corresponding reference characters indicate corresponding parts, and wherein:

FIG. 1 is a diagram of an acoustic calibration tank utilized in the subject method.

DETAILED DESCRIPTION OF THE INVENTION

A reverse calibration process can be used to calibrate the acoustic test tank shown in FIG. 1. This process uses a reverse calibration hydrophone 12 that is calibrated in a reciprocity coupler over a range of pressures and temperatures according to the specification. Through the reciprocity coupling process, the free field voltage sensitivity of the reverse calibration hydrophone 12 will be known. This reverse calibration hydrophone 12 can be positioned at one of the mounting locations 32A, 32B, 32C, 32D, 32E, or 32F. Hydrophone 12 is mounted at 32A in the FIG. Mounting location 32A is opposite reference hydrophone 30A, and this position will facilitate calibration of reference hydrophone 30A because both hydrophones 12 and 30A are in the same longitudinal position in tank 16 and will experience the same amplitude of an acoustic wave in the tank. Hydrophone 12 and hydrophone 30A are electrically connected to processor 34 for data collection. Tank 16 interior 24 is filled with a fluid for test. Fluid should be an acoustically well characterized fluid such as distilled water or standardized seawater.

Processor 34 provides signals to transducer 28A and 28B at the ends of tank 16. Signals are calculated to produce a known acoustic wave in the interior 24 of tank 16. Typically, the known acoustic wave is a standing wave having nodes and crests at known longitudinal locations within tank 16. Voltage outputs from the reference hydrophone 30A and reverse calibration hydrophone 12 are received by processor 34 and recorded. Voltage outputs are recorded at a plurality of pressures and temperatures of interest as set by environmental control 26.

In order to calibrate reference hydrophone 30A, a reverse process is used. Reference hydrophone 30A voltage is $V_{reference}$, and reverse calibration hydrophone voltage is $V_{reverse}$. The sensitivity of the reverse calibration hydrophone, $M_{reverse}$ is used as the known FFVS. $M_{reference}$, the sensitivity of the reference hydrophone, is the calculated FFVS utilizing the following equation:

$$M_{reference} = M_{reverse} + 20\log\left(\frac{V_{reference}}{V_{reverse}}\right). \tag{4}$$

Equation (4) allows calibration of the reference hydrophone sensitivity without removing the reference hydrophone from the tank. Reverse calibration hydrophone 12 can be repositioned to the same longitudinal position as each of the reference hydrophones and the corresponding reference hydrophone can be calibrated as described above.

In another embodiment, one can use a plurality of reverse calibration hydrophones for simultaneous calibration of the hydrophones in the tank. Reverse calibration hydrophones can be positioned at positions 32A, 32B, 32C, 32D, 32E and 32F and joined to provide output to processor 34. As before, a known acoustic wave can be created in the interior 24 of tank 16. The known acoustic wave could be a traveling wave so that the crest of the wave would pass each reference hydrophone position and each reverse calibration hydrophone position. Voltages can be collected from the reference hydrophones and the reverse calibration hydrophones. FFVS or sensitivity can be calculated from these voltages at known time intervals. Environmental control 26 can be used to change the temperature and pressure of the fluid in interior 24 between test runs. Sensors within vessel 14 can be utilized for insuring accurate measurement of temperature and pressure. This embodiment of the method could be useful for calibrating a new tank or recalibrating a tank when one has a plurality of calibrated hydrophones.

Another embodiment of the method could utilize a single reverse calibration hydrophone with a traveling wave to calibrate reference hydrophones at different longitudinal positions. Using the known travel time of the traveling wave, the voltage and sensitivity of the reverse calibration hydrophone can be compared with the voltage of any reference hydrophone to calculate the sensitivity of the reference hydrophone. This enables an expedited calibration of all of the reference hydrophones.

Embodiments utilizing traveling waves may require an iterative procedure to establish a good traveling wave sound field. A set of sensitivity deviated reference hydrophones may not be able to set up perfect traveling wave acoustic field in a single test iteration. However, the reverse calibration hydrophone or hydrophones can be of use in bringing the deviated reference hydrophone closer to its true sensitivity. This establishes a better traveling wave sound field for another run. By iteration, a better traveling wave sound field can further bring these reference hydrophone sensitivities closer to their true FFVS making the next run reverse calibration process more accurate. After a couple of cycles, the deviated reference hydrophone can be finally reverse calibrated to its true sensitivity FFVS value.

This new reverse calibration technique provides a convenient way to recalibrate the in-tank reference hydrophones without the need to disassemble the pressure tank. It avoids high system maintenance cost and saves critical time, while maintaining the system operational status.

The inventive method can be practiced in other forms than depicted herein. It should be understood that the figures are just one particular embodiment whereby the invention may be practiced and other configurations are possible as is apparent to one skilled in the art. It will be understood that many additional changes in the details, materials, steps and arrangement of parts, spacing between the sensors and vessel interior wall surface, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for calibrating an acoustic calibration tank comprising the steps of:
   providing the acoustic calibration tank cylindrical wall defining an internal volume having a plurality of reference hydrophones positioned longitudinally along the wall and a reverse hydrophone position along the wall with each position being radially opposite one reference hydrophone;
   providing a calibrated hydrophone having a known free field voltage sensitivity at a first reverse hydrophone position radially opposite one of the plurality of reference hydrophones to be calibrated;
   filling the acoustic calibration tank internal volume with a fluid having a known temperature and a known pressure;
   creating a known acoustic wave within the acoustic calibration tank fluid;
   measuring a voltage output of the calibrated hydrophone;
   measuring a voltage output from the reference hydrophone to be calibrated;
   computing a free field voltage sensitivity for the reference hydrophone to be calibrated from the measured voltage output of the calibrated hydrophone, the known free field sensitivity of the calibrated hydrophone, and the measured voltage output from the reference hydrophone to be calibrated; and
   utilizing the computed free field voltage sensitivity for the reference hydrophone as the calibration factor at the acoustic calibration tank inner volume temperature and pressure.

2. The method of claim 1 further comprising:
   changing the known pressure of the fluid to a new known pressure;
   creating a known acoustic wave within the acoustic calibration tank fluid at the new known pressure;
   measuring a voltage output of the calibrated hydrophone at the new known pressure;
   measuring a voltage output from the reference hydrophone to be calibrated at the new known pressure;
   computing a free field voltage sensitivity for the reference hydrophone to be calibrated from the measured voltage output of the calibrated hydrophone, the known free field sensitivity of the calibrated hydrophone, and the measured voltage output from the reference hydrophone to be calibrated; and
   utilizing the computed free field voltage sensitivity for the reference hydrophone as the calibration factor at the acoustic calibration tank inner volume known temperature and new known pressure.

3. The method of claim 1 further comprising:
   changing the known temperature of the fluid to a new known temperature;
   creating a known acoustic wave within the acoustic calibration tank fluid at the new known temperature;
   measuring a voltage output of the calibrated hydrophone at the new known temperature;
   measuring a voltage output from the reference hydrophone to be calibrated at the new known temperature;
   computing a free field voltage sensitivity for the reference hydrophone to be calibrated from the measured voltage output of the calibrated hydrophone, the known free field sensitivity of the calibrated hydrophone, and the measured voltage output from the reference hydrophone to be calibrated; and
   utilizing the computed free field voltage sensitivity for the reference hydrophone as the calibration factor at the acoustic calibration tank inner volume new known temperature and known pressure.

4. The method of claim 1 further comprising the step of:
   repositioning the calibrated hydrophone to another reverse hydrophone position radially opposite an other of the plurality of reference hydrophones to be calibrated;
   creating a known acoustic wave within the acoustic calibration tank fluid having the repositioned calibrated hydrophone;
   measuring a voltage output of the calibrated hydrophone of the repositioned calibrated hydrophone;
   measuring a voltage output from the other reference hydrophone to be calibrated opposite the repositioned calibrated hydrophone;
   computing a free field voltage sensitivity for the other reference hydrophone to be calibrated from the measured voltage output of the calibrated hydrophone, the known free field sensitivity of the calibrated hydrophone, and the measured voltage output from the other reference hydrophone to be calibrated; and
   utilizing the computed free field voltage sensitivity for the other reference hydrophone as the calibration factor at the acoustic calibration tank inner volume known temperature and known pressure.

* * * * *